US012650942B2

(12) United States Patent
Rasor et al.

(10) Patent No.: US 12,650,942 B2
(45) Date of Patent: Jun. 9, 2026

(54) DYNAMICALLY ALIGNING DATA PROCESSING RESOURCES

(71) Applicant: International Business Machines Corporation, Armonk, NY (US)

(72) Inventors: Louis A. Rasor, Tucson, AZ (US); Todd C. Sorenson, Tucson, AZ (US); Veronica Suzette Davila, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 18/908,582

(22) Filed: Oct. 7, 2024

(65) Prior Publication Data

US 2026/0099452 A1     Apr. 9, 2026

(51) Int. Cl.
*G06F 13/28*          (2006.01)
(52) U.S. Cl.
CPC .......... *G06F 13/28* (2013.01); *G06F 2213/28* (2013.01)
(58) Field of Classification Search
None
See application file for complete search history.

(56) References Cited

U.S. PATENT DOCUMENTS

| | | | |
|---|---|---|---|
| 10,209,904 B2 | 2/2019 | Himelstein et al. | |
| 10,565,020 B2 | 2/2020 | Davila et al. | |
| 11,636,059 B2 | 4/2023 | Arul Dhas et al. | |
| 11,734,204 B2 | 8/2023 | Cao et al. | |
| 12,073,109 B2 | 8/2024 | Neverovitch et al. | |
| 2005/0223131 A1* | 10/2005 | Goekjian | G06F 13/28 710/22 |
| 2014/0281335 A1* | 9/2014 | Xu | G06F 13/1631 711/170 |
| 2015/0134882 A1* | 5/2015 | Lin | G06F 3/0656 711/103 |

OTHER PUBLICATIONS

Infineon, "How to use direct memory access (DMA) controller in TRAVEO™ T2G family," infineon Application Note AN220191, Nov. 10, 2023, 86 pages.
Rhu et al., "Compressing DMA Engine: Leveraging Activation Sparsity for Training Deep Neural Networks," International Symposium on High-Performance Computer Architecture, 2018, 14 pages, retrieved from https://www.cs.utexas.edu/~skeckler/pubs/HPCA_2018_CDMA.pdf.

(Continued)

*Primary Examiner* — Scott C Sun
(74) *Attorney, Agent, or Firm* — Stephen R. Yoder

(57) ABSTRACT

A method, according to one approach, includes: allocating a group of central processing units in a system to an input/output (I/O) resource. A group of mail slots are also allocated from memory in the system, where the allocated mail slots are configured to receive read and/or write commands from the I/O resource. The method further includes allocating a group of direct memory access engine channels in the system to the I/O resource. The direct memory access engine channels are allocated such that a first subset of the direct memory access engine channels are configured to perform read commands for the mail slots, and a second subset of the direct memory access engine channels are configured to perform write commands for the mail slots.

20 Claims, 6 Drawing Sheets

(56) References Cited

OTHER PUBLICATIONS

Mera et al., "DICE: Automatic Emulation of DMA Input Channels for Dynamic Firmware Analysis," arXiv, 2021, pp. 1-17, retrieved from https://arxiv.org/abs/2007.01502.

Intel, "Multi Channel DMA for PCI Express* Intel® FPGA IP Design Example User Guide," Intel, Sep. 15, 2021, 64 pages.

Anonymous, "Method for an in-line computation engine in the I/O-to-memory data path," IP.com Prior Art Database, Technical Disclosure No. IPCOM000125748D, Jun. 15, 2005, 11 pages.

Anonymous, "A Method for Direct Memory Access (DMA)," IP.com Prior Art Database, Technical Disclosure No. IPCOM000127437D, Aug. 30, 2005, 6 pages.

Anonymous, "Flow Control Based DMA Architecture," IP.com Prior Art Database, Technical Disclosure No. IPCOM000174431D, Sep. 24, 2008, 5 pages.

Anonymous, "Method for an IOH data-in cache to speed up DMA engine performance," IP.com Prior Art Database, Technical Disclosure No. IPCOM000135346D, Apr. 11, 2006, 6 pages.

* cited by examiner

100

300

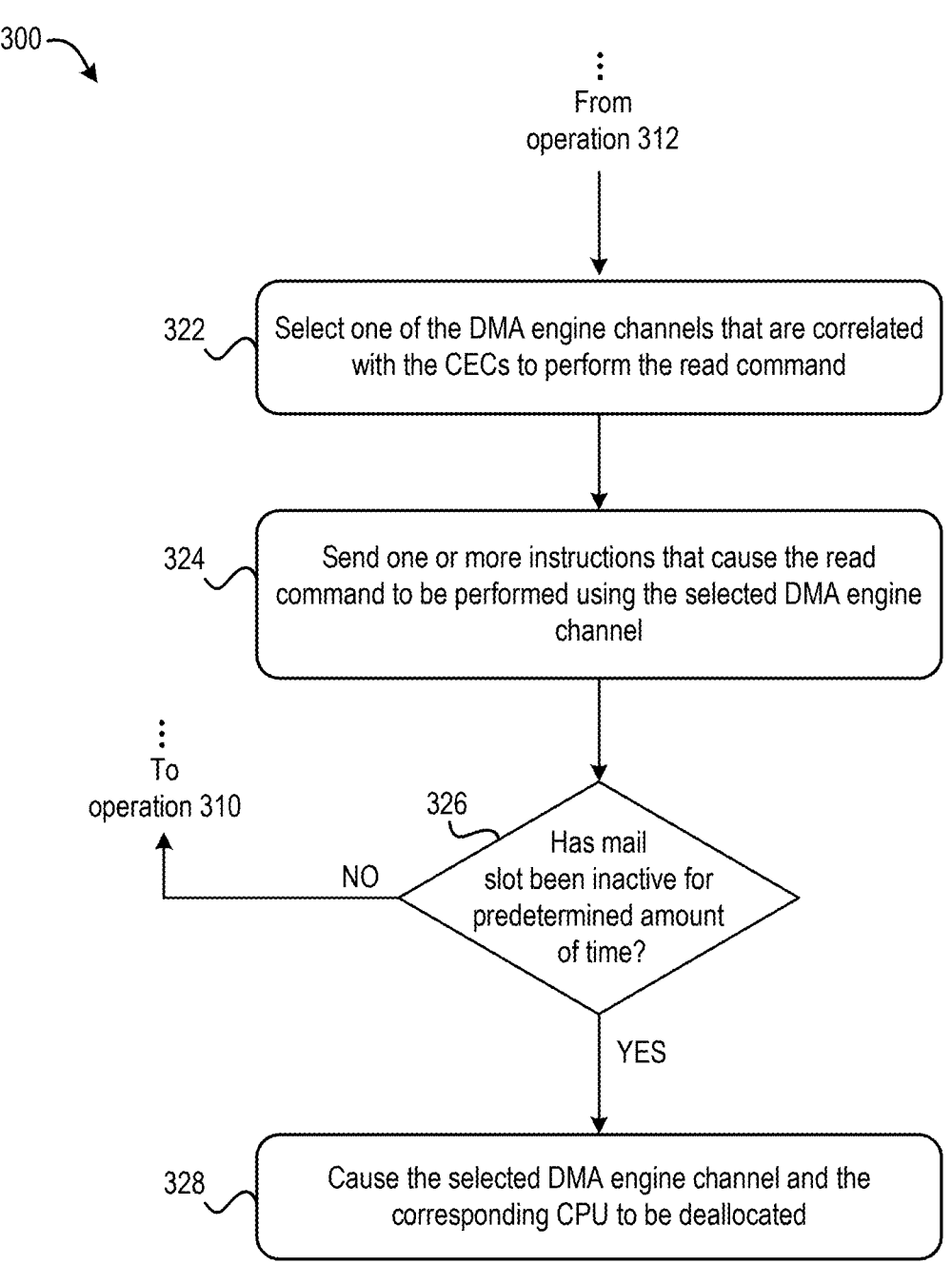

⋮
From
operation 312

322  Select one of the DMA engine channels that are correlated with the CECs to perform the read command 324  Send one or more instructions that cause the read command to be performed using the selected DMA engine channel ⋮
To
operation 310

326  Has mail slot been inactive for predetermined amount of time?

NO

YES

328  Cause the selected DMA engine channel and the corresponding CPU to be deallocated FIG. 3
(Continued)

DYNAMICALLY ALIGNING DATA PROCESSING RESOURCES

BACKGROUND

The present invention relates to data processing, and more specifically, this invention relates to dynamically aligning data processing resources.

Data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This has also become more prevalent as the complexity of machine learning models increases. Increasingly complex machine learning models translate to more intense workloads and increased strain associated with applying the models to received data. The operational efficiency of conventional products has thereby been negatively impacted.

While cloud computing has been implemented in an effort to improve the ability to process this increasing amount of data, moving large workloads to the cloud introduces new considerations. For example, as more data is uploaded to central locations for storage and/or processing, the process of ensuring data retention becomes increasingly difficult.

SUMMARY

A method, according to one approach, includes: allocating a group of central processing units (CPUs) in a system to an input/output (I/O) resource. A group of mail slots are also allocated from memory in the system, where the allocated mail slots are configured to receive read and/or write commands from the I/O resource. The method further includes allocating a group of direct memory access (DMA) engine channels in the system to the I/O resource. The DMA engine channels are allocated such that a first subset of the DMA engine channels are configured to perform read commands for the mail slots, and a second subset of the DMA engine channels are configured to perform write commands for the mail slots.

A computer program product, according to another approach, includes: one or more computer-readable storage media. The computer program product also includes program instructions that are stored on the one or more storage media to perform the foregoing method.

A computer system, according to yet another approach, includes: a processor set, and one or more computer-readable storage media. The computer system also includes program instructions that are stored on the one or more storage media to cause the processor set to perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
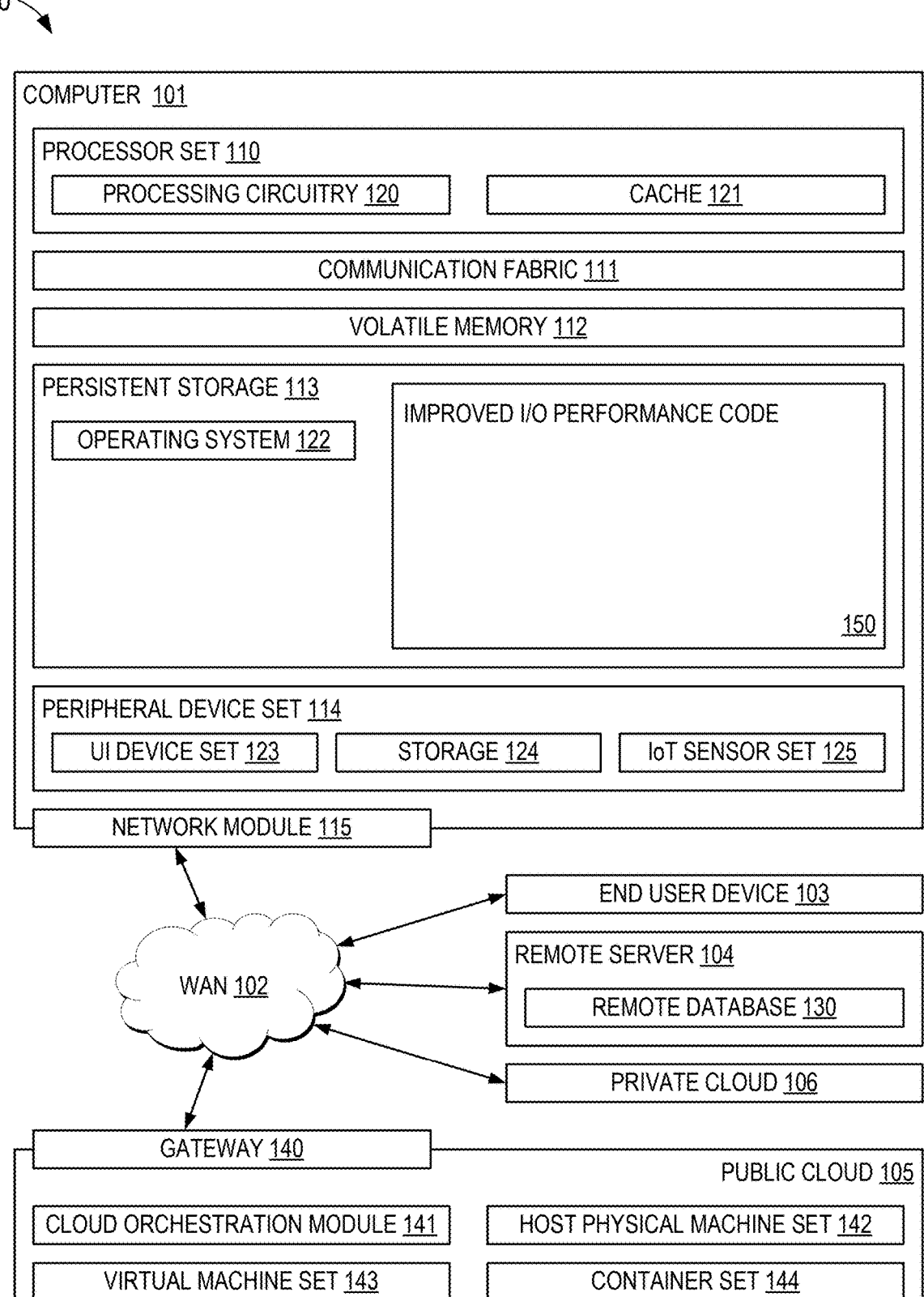
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for dynamically aligning groups of DMA engine channels and CPUs to I/O resources. This desirably allows for approaches herein to successfully perform I/O commands without locking the corresponding components. The approaches are thereby able to satisfy received read and/or write commands more efficiently than conventionally achievable, leading to reduced latency and causing performance as a whole to be improved, e.g., as will be described in further detail below.

In one general approach, a method includes: allocating a group of CPUs in a system to an I/O resource. A group of mail slots are also allocated from memory in the system, where the allocated mail slots are configured to receive read and/or write commands from the I/O resource. The method further includes allocating a group of DMA engine channels in the system to the I/O resource. The DMA engine channels are allocated such that a first subset of the DMA engine channels are configured to perform read commands for the mail slots, and a second subset of the DMA engine channels are configured to perform write commands for the mail slots.

In another general approach, a computer program product includes: one or more computer-readable storage media. The computer program product also includes program instructions that are stored on the one or more storage media to perform the foregoing method.

In yet another general approach, a computer system includes: a processor set, and one or more computer-readable storage media. The computer system also includes program instructions that are stored on the one or more storage media to cause the processor set to perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved I/O performance code at block 150 for dynamically aligning groups of DMA engine channels and CPUs to I/O resources. This desirably allows for approaches herein to successfully perform I/O commands without locking the corresponding components. The approaches are thereby able to satisfy received read and/or write commands more efficiently than conventionally achievable, leading to reduced latency and causing performance as a whole to be improved, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI)

device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device.

In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operational efficiency of conventional products has thereby been negatively impacted.

While cloud computing has been implemented in an effort to improve the ability to process this increasing amount of data, moving large workloads to the cloud introduces new issues. For example, as more data is uploaded to central locations for storage and/or processing, the process of ensuring data retention becomes increasingly difficult. In situations where a source sends commands to a control unit having multiple CPUs, satisfying each command involves performing locks on the components and/or memory locations. While this helps ensure data retention, it also causes significant contention between the CPUs and reduces operational efficiency as a whole by complicating the process of satisfying every command.

In sharp contrast to these conventional shortcomings, approaches herein are able to dynamically align groups of DMA engine channels and CPUs to I/O resources. This desirably allows for approaches herein to successfully perform I/O requests without locking the corresponding components. Approaches herein are thereby able to satisfy received read and/or write commands more efficiently than conventionally achievable, leading to reduced latency and causing performance as a whole to be improved, e.g., as will be described in further detail below.

Figure 2A:
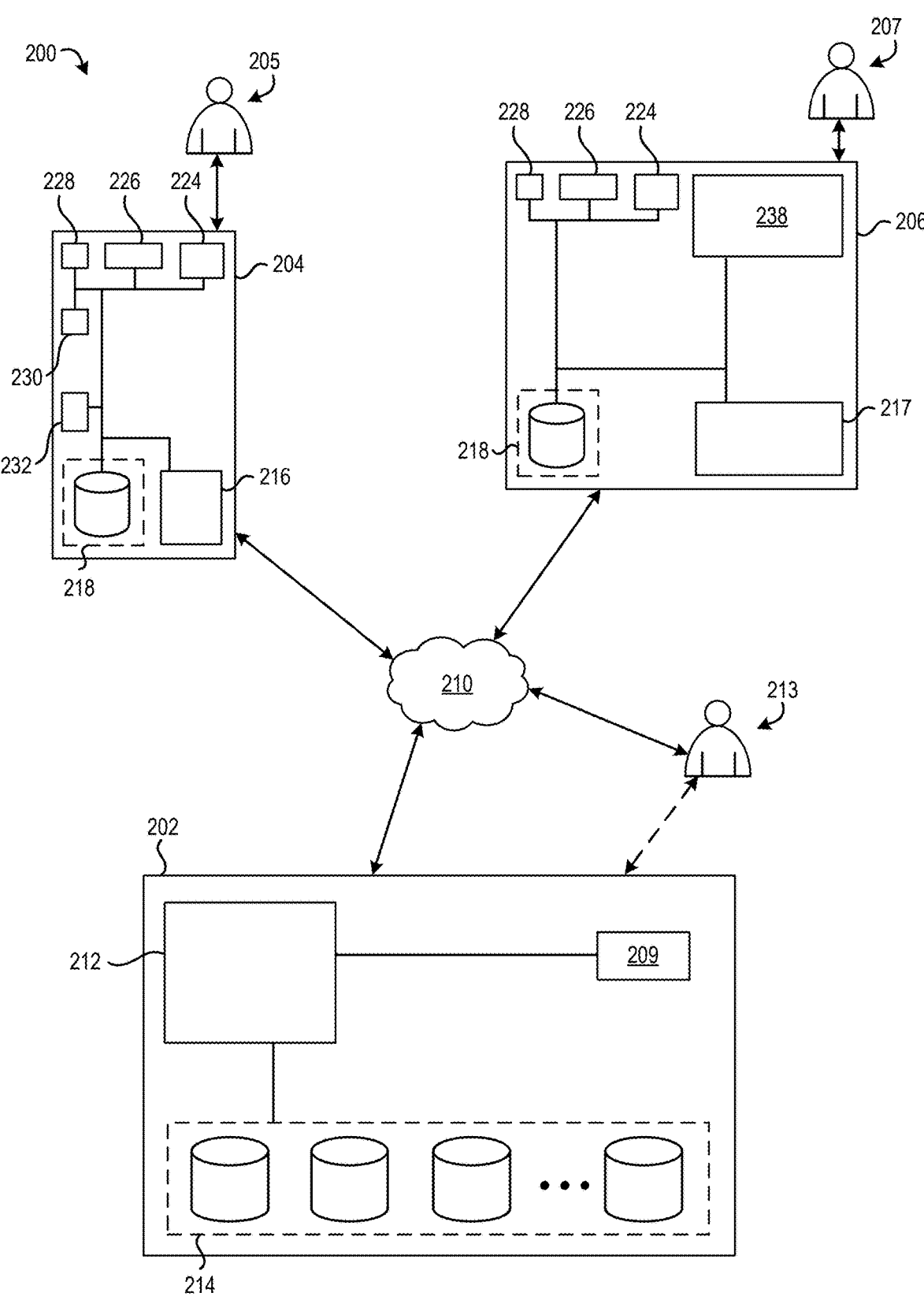
FIG. 2A is a representational view of a distributed system, in accordance with one approach.

Looking now to FIG. 2A, a distributed data storage system 200 in accordance with one approach. As an option, the present system 200 may be implemented in conjunction with features from any other approach listed herein, such as those described with reference to the other FIGS. However, this distributed data storage system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the distributed data storage system 200 includes a central server 202 that is connected to user device 204 and edge node 206. Specifically, the central server 202, user device 204, and edge node 206 are connected to a network 210 that allows for data (e.g., information, commands, requests, instructions, responses, encrypted data, etc.) to be sent between any of the locations 202, 204, 206.

The network 210 may be of any type, e.g., depending on the desired approach. For instance, in some approaches the network 210 is a SAN. However, an illustrative list of other network types which network 210 may implement includes, but is not limited to, a LAN, a PSTN, a WAN, an internal telephone network, etc. As a result, any desired information, data, commands, instructions, responses, requests, etc. may be sent between the locations 202, 204, 206, regardless of the amount of separation which exists therebetween, e.g., despite being positioned at different geographical locations. It should also be noted that the different locations 202, 204, 206 may be connected to each other (and/or other locations) differently depending on the approach. According to an example, two host locations may be located relatively close to each other and connected by a wired connection, e.g., a cable, a fiber-optic link, a wire, etc.; etc., or any other type of connection which would be apparent to one skilled in the art after reading the present description.

With continued reference to FIG. 2A, the user device 204 and edge node 206 may have different configurations than the central server 202. For example, in some implementations the central server 202 includes a large (e.g., robust) processor 212 coupled to a cache 209 and memory 214 having a relatively high storage capacity that may be accessible to a system administrator 213. The central server 202 is thereby able to process and store a relatively large amount of data, allowing it to be connected to and managed by, multiple different remote locations. For example, user device 204 and/or edge node 206 may generate I/O commands that are transmitted to central server 202 and evaluated (e.g., performed) by processor 212. The edge node 206 itself may similarly receive I/O commands from user device 204 and/or central server 202, and use controller 217 therein evaluate them.

Figure 2C:
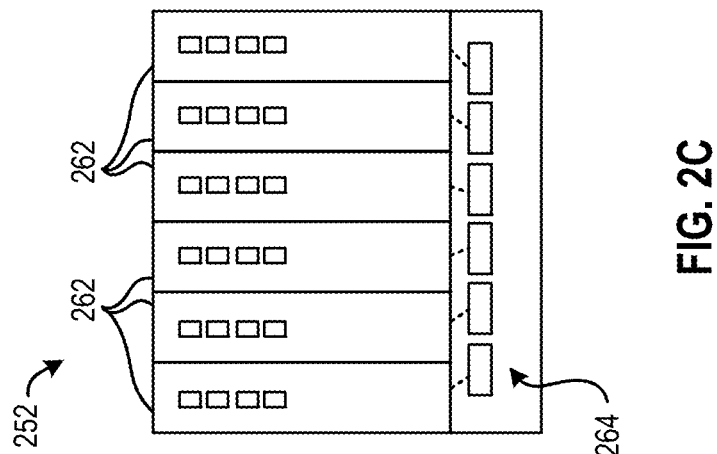
FIG. 2C is a representational view of an I/O bay in the control sub-system of FIG. 2B, in accordance with one approach.
Figure 2B:
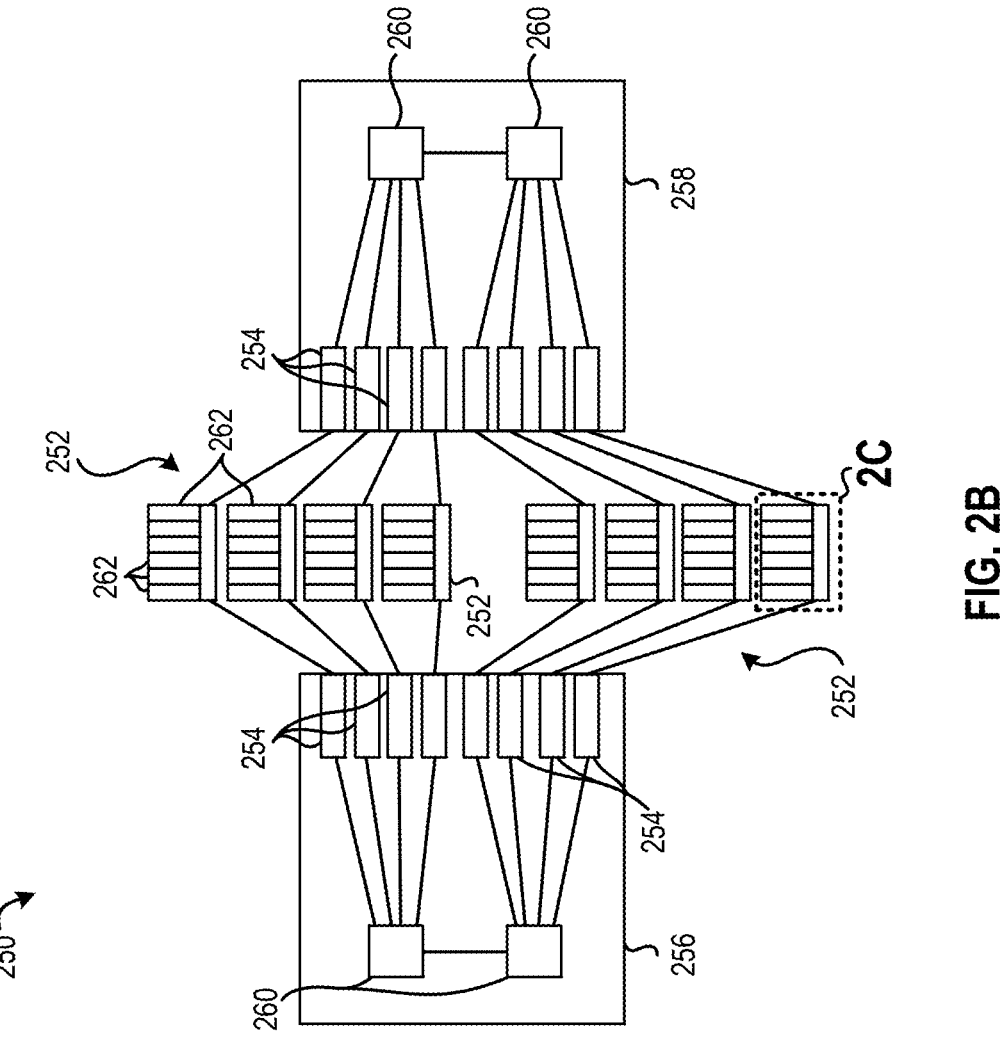
FIG. 2B is a more detailed view of a control sub-system, in accordance with one approach.

Referring momentarily now to FIG. 2B, a control subsystem 250 is illustrated in accordance with one approach. It should be noted that the control sub-system 250 may be implemented in processor 212 of FIG. 2A in some approaches. Accordingly, the present configuration may be implemented in conjunction with features from any other approach listed herein, such as those described with reference to the other FIGS.

As shown, the control sub-system 250 includes a number of I/O bays 252. The I/O bays 252 are further connected to slots 254 extending across the respective CECs 256, 258.

These slots 254 are also connected to microprocessors 260. It follows that slots 254 provide access (e.g., channels) to the respective I/O bays 252 and microprocessors 260. According to one approach, at least one of the microprocessors may include a POWER9 microprocessor. Moreover, the connections extending between the I/O bays 252, slots 254, and microprocessors 260 preferably include Peripheral Component Interconnect Express (PCIe) cables. However, any of the components in FIG. 2B may be connected using any desired physical (or wireless) connection(s) that may be apparent to one skilled in the art after reading the present description.

The I/O bays 252 are also shown as including a number of adapter slots 262 therein. For example, FIG. 2C provides a detailed view of the I/O bay 252 in FIG. 2B, taken along callout "2C". In FIG. 2C, the adapter slots 262 may include device adapter slots and/or host adapter slots, e.g., depending on the approach. Each of the adapter slots 262 also corresponds to a respective one of the ports 264 shown, which may in turn be used to connect the control sub-system 250 to one or more other locations. According to an example which is in no way intended to be limiting, one or more of the ports 264 may be configured such that they are compatible with ZHYPERLINK based connections, e.g., as would be appreciated by one skilled in the art after reading the present description.

Returning back now to FIG. 2A, it follows that processor 212 at central server 202 and/or controller 217 at edge node 206 may implement any of the approaches described above with respect to FIGS. 2B-2C. As a result, processor 212 at central server 202 and/or controller 217 at edge node 206 may be able to satisfy I/O commands (e.g., also referred to herein as requests, instructions, etc.) received over time from one or more sources. For instance, read and/or write commands may be received from an I/O resource, e.g., such as a running application, a host, trained AI based models, etc. The read and/or write commands involve accessing source memory locations to read data therefrom and/or add data thereto. With respect to the present description, a "source" memory location refers to the location that data is read from and/or written to in memory, e.g., as referenced by a read and/or write command. For example, the DMA engine used will be based on the proximity to the data that is being accessed. Accordingly, read commands will cause the DMA engine on a control unit to be used, as the data being read is on the control unit. Write commands will cause the DMA engine on the I/O bay to be used, as the data being written is on the I/O bay.

It should be noted that with respect to the present description, "data" may include any desired type of information. For instance, in different implementations data can include raw sensor data, metadata, program commands, instructions, etc. Moreover, while implementations herein are described in the context of unencrypted data, this is in no way intended to be limiting. Data may be protected with different types of security features in certain approaches. The way in which data is protected has an impact on how that data may be processed and/or stored. For instance, the processor 212 may use a secure software environment to process incoming read and/or write commands that involve encrypted data, where the secure software environment may only be accessed by a secure engine.

Looking to the user device 204, it may be a personal computer and/or mobile phone that includes a processor 216 coupled to memory 218. The processor 216 may receive inputs from, and interface with, user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc.

Looking to edge node 206, some of the components included therein may be the same or similar to those included in user device 204, and have therefore been given corresponding numbering. For instance, controller 217 is coupled to memory 218, a display screen 224, keys of a computer keyboard 226, and a computer mouse 228, which are accessible to administrator 207. Additionally, the controller 217 is coupled to an AI module 238. The AI module 238 may include any desired number and/or type of AI-based models, e.g., such as machine learning models, deep learning models, neural networks, etc. Moreover, the models may be trained to perform certain procedures (e.g., identify patterns), e.g., as would be appreciated by one skilled in the art after reading the present description.

Figure 3:
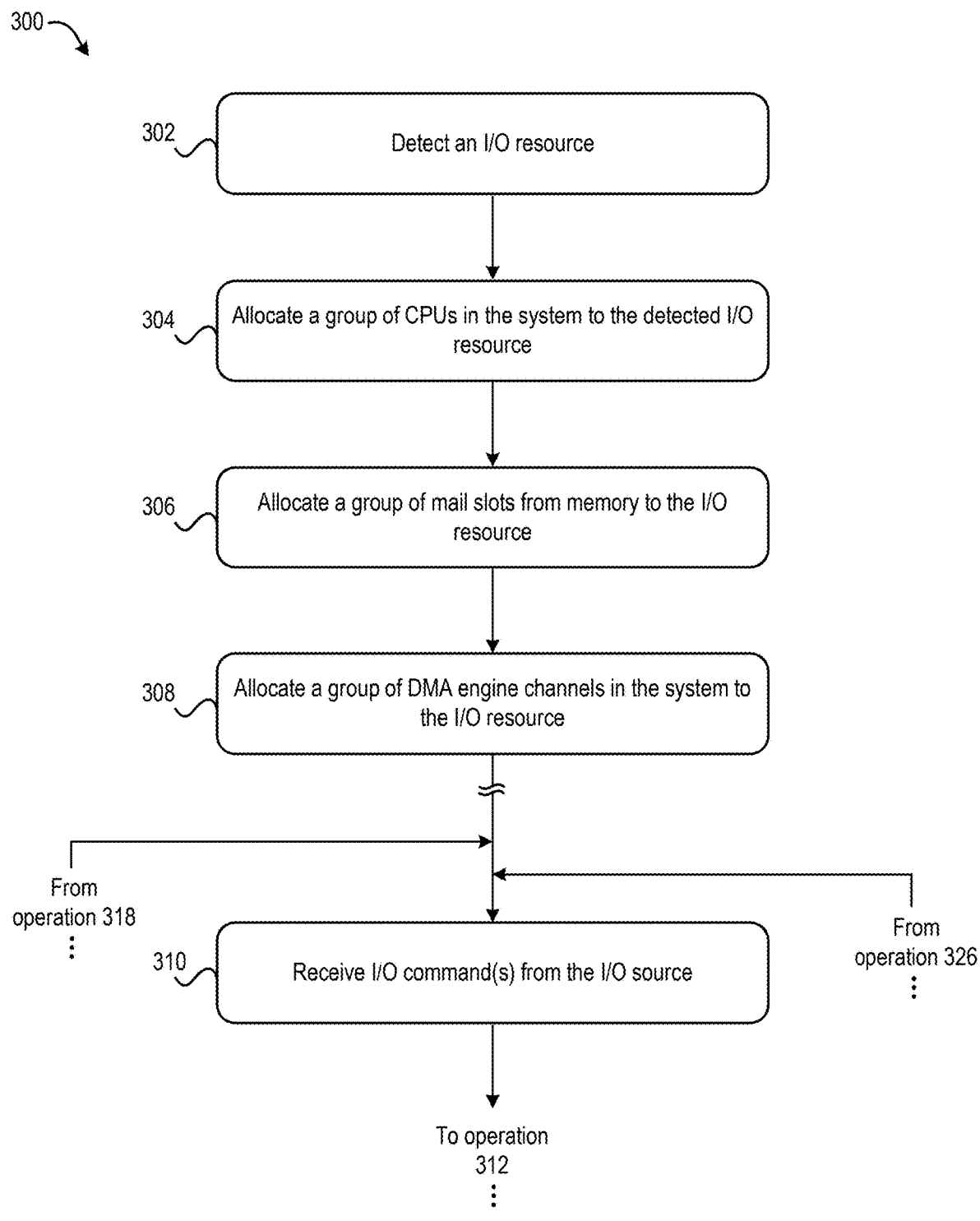
FIG. 3 is a flowchart of a method, in accordance with one approach.
Figure 3:
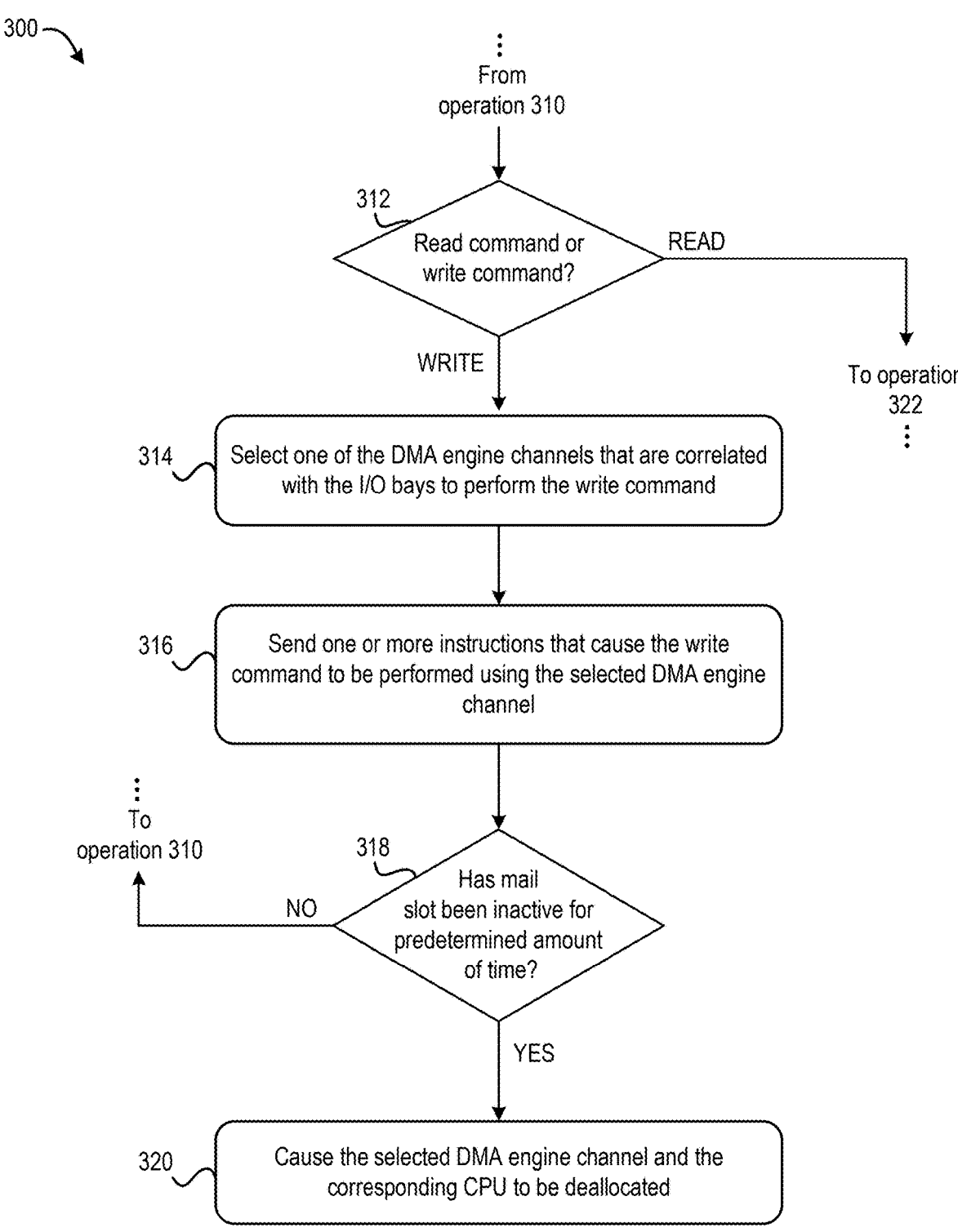

Looking now to FIG. 3, a flowchart of a computer-implemented-method 300 for dynamically aligning groups of DMA engine channels and CPUs to I/O resources in accordance with one approach. One or more of the operations in method 300 thereby desirably allow for approaches herein to successfully perform I/O commands without locking the corresponding components. As a result, approaches herein are able to satisfy received read and/or write commands more efficiently than conventionally achievable, leading to reduced latency and causing performance as a whole to be improved.

The method 300 may be performed in accordance with the present invention in any of the environments depicted in FIGS. 1-2C, among others, in various approaches. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a controller, a processor, a computer, etc., or some other device having one or more processors therein. Thus, in some approaches, method 300 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module (s) implemented in hardware and/or software, and preferably having at least one hardware component may be utilized in any device to perform one or more steps of the method 300. Illustrative processors include, but are not limited to, a CPU, an application specific integrated circuit (ASIC), a field programmable gate array (FPGA), etc., combinations thereof, or any other suitable computing device known in the art.

As shown, operation 302 of method 300 includes detecting an I/O resource. As mentioned above, an I/O resource is a source of operations that involve (e.g., reference) data at source locations in memory. The I/O resource may include a running application, a host, trained AI based models, etc. Moreover, the I/O resource may be detected in a number of different ways. In some approaches, the I/O resource may be detected in response to the I/O resource being powered on and activating a connection (e.g., communication channel) with the controller, processor, control sub-system, etc., that may actually be performing one or more of the operations in method 300. In other approaches, the I/O resource may be detected in response to receiving a request from the I/O resource to begin sending I/O commands.

In response to detecting an I/O resource, method 300 advances from operation 302 to operation 304. There, operation 304 includes allocating a group of CPUs in the system to the detected I/O resource. In other words, operation 304 includes selecting at least some of the CPUs that are available in the system that detected the I/O resource, and dedicating those CPUs to processing I/O commands that are received from the I/O resource. Thus, the CPUs selected in operation 304 may prioritize performing read and/or write commands that are received from the I/O resource, e.g., in comparison to other read and/or write commands that may be processed by the system.

The number of CPUs that are allocated to the I/O resource may vary depending on the approach. For example, the size and/or type of I/O resource detected in operation 302 may impact the number of CPUs that are allocated thereto. In other approaches, the number of CPUs that are allocated may be determined in response to evaluating a sample stream of read and/or write commands, e.g., in order to achieve a desired throughput. In still other approaches, the number of CPUs allocated to the I/O resource may be predetermined by a user, based on industry standards, based on existing throughput of the system, etc. It should also be noted that although the CPUs selected in operation 304 are dedicated to the I/O resource, they may be used to perform other read and/or write commands while the I/O resource is inactive. Each CPU dedicated to the I/O resource may thereby inspect mail slots for read and/or write commands from the I/O resource periodically, e.g., after completing each command string not received from the I/O resource.

From operation 304, method 300 advances to operation 306. There, operation 306 includes allocating a group of mail slots from memory in the system, to the I/O resource. In other words, operation 306 includes selecting at least some of the mail slots that are available in the system that detected the I/O resource in operation 302, and dedicating those mail slots to receiving (e.g., taking in) I/O commands that are sent to the system from the I/O resource. Thus, the mail slots selected in operation 306 may be configured to highlight read and/or write commands that are received from the I/O resource, e.g., in comparison to other read and/or write commands that may be processed by the system. In some approaches, the group of mail slots selected in operation 306 may only be able to receive read and/or write commands from the I/O resource. In such approaches, CPUs may simply scan the mail slots to see if any include commands from the I/O resource. In other approaches, the mail slots may specify read and/or write commands received from the I/O resource compared to commands received from elsewhere, by setting flags, incrementing and/or decrementing counters, applying metadata tags, etc.

The number of mail slots that are selected in operation 306 may vary depending on the approach. For instance, the size and/or type of I/O resource detected in operation 302 may impact the number of mail slots that are allocated thereto. In some approaches, the number of mail slots selected in operation 306 is about equal to (or at least similar to) the number of CPUs selected in operation 304. Thus, each mail slot may be correlated with a respective one of the CPUs. In other approaches, the number of mail slots that are allocated may be determined in response to evaluating a sample stream of read and/or write commands from the I/O resource, e.g., in order to achieve a desired throughput. In still other approaches, the number of mail slots allocated to the I/O resource may be predetermined by a user, based on industry standards, based on existing throughput of the system, etc. As noted above, although the mail slots selected in operation 306 are dedicated to the I/O resource, they may be used to receive other read and/or write commands while the I/O resource is inactive.

With continued reference to FIG. 3, method 300 advances from operation 306 to operation 308. There, operation 308 includes allocating a group of DMA engine channels in the system to the I/O resource. In other words, operation 308 includes dedicating a select number of DMA engine channels to prioritize commands that are received from the I/O resource.

While the number of DMA engine channels that are selected in operation 308 may also vary depending on the approach, there are preferably more DMA engine channels than the number of selected mail slots or CPUs. For instance, twice as many DMA engine channels may be selected in operation 308 than the number of mail slots selected in operation 306 or the number of CPUs selected in operation 304. In other words, the group selected in operation 304 may include "N" CPUs, the group selected in operation 306 may include "N" mail slots, and the group selected in operation 308 may include 2(N) DMA engine channels. This allows for DMA channels to be located differently in the system, causing the DMA channels to have differing levels of effectiveness for each type of received command.

According to some approaches, a portion of the DMA engine channels selected in operation 308 are correlated with (e.g., located on) CECs of the system, while a remaining portion of the DMA engine channels selected in operation 308 are correlated with (e.g., located on) I/O bays of the system (e.g., see FIGS. 2B-2C). DMA engine channels correlated with the system CECs may thereby be configured (e.g., programmed) to perform read commands received in the mail slots, while DMA engine channels correlated with I/O bays of the system are configured to perform write commands received in the mail slots. In some approaches, the DMA engine channels are combined into pairs, each pair including a DMA engine channel on the I/O bays and a DMA engine channel on the CECs. Each read and/or write command received at a mail slot may thereby be performed (satisfied) by the DMA engine channel(s) in a respective pair. The specific DMA engine channels are thereby able to reduce the overhead and latency associated with performing read and write commands in the system.

In response to completing operation 308, method 300 has effectively built (e.g., allocated) a set of components that are dedicated to performing read and/or write commands that are received from the I/O source. It follows that operations 302, 304, 306, and 308 may be performed in response to detecting an (e.g., each) I/O source that is detected. Following operation 308 and before receiving any commands from the I/O source, the DMA engine channels, CPUs, and/or the mail slots allocated to the I/O source may be used to perform other (e.g., outstanding) I/O commands. For example, the allocated components may be used to work on a backlog of read and/or write commands accumulated in a buffer.

However, in response to receiving one or more read and/or write commands (also referred to herein as I/O commands) from the I/O source, resources from the groups allocated in operations 304, 306, and 308 are utilized to satisfy the received commands. Method 300 thereby advances from operation 308 to operation 310 where the read and/or write command(s) is received from the I/O source at one of the allocated mail slots. Advancing to operation 312, the received command is inspected in the mail slot and a determination is made as to whether it is a read command or a write command.

In response to determining a write command has been received from the I/O source, method 300 advances from operation 312 to operation 314. There, operation 314 includes selecting one of the DMA engine channels that are correlated with the I/O bays to perform the write command. As noted above, DMA engine channels at the I/O bays are able to perform at least a portion of received write commands more efficiently than DMA engine channels on the CECs. Thus, by selecting one of the DMA engine channels correlated with the I/O bays, method 300 is able to perform the write command more efficiently than is otherwise achievable, e.g., as would be appreciated by one skilled in the art after reading the present description.

The DMA engine channels at the I/O bays may further be inspected and selected from in order to improve performance. For instance, DMA engine channels at the I/O bays are evaluated based at least in part on how close the respective DMA engine channels are located to a memory source of the write command. DMA engine channels at I/O bays that are logically and/or physically closer to the source (e.g., target) of the write command may thereby be selected to further reduce latency and performance overhead.

From operation 314, method 300 advances to operation 316. There, operation 316 includes sending one or more instructions that cause the write command to be performed using the selected DMA engine channel. In other words, one or more instructions are sent causing the write command to be performed by the DMA engine channel selected in operation 314, along with the respective CPU that is correlated with the mail slot that received the write command. As noted above, because correlated groupings of components are utilized to perform I/O commands received from a source, the I/O commands may be satisfied without locking the corresponding components. Avoiding the process of locking and unlocking resources has a significant impact, and approaches herein are able to satisfy received read and/or write commands more efficiently than conventionally achievable, leading to reduced latency and causing performance as a whole to be improved further still.

In response to the write command being satisfied, method 300 advances to operation 318. There, operation 318 determines whether the mail slot that received the write command has been inactive for a predetermined amount of time. It follows that operation 318 may include inspecting (e.g., monitoring) the mail slot that received the write command and identifying any commands or other information that is received therein. The predetermined amount of time may be set by a user, a system administrator, during manufacture as a result of performance testing, based on industry standards, etc.

In response to determining that the mail slot has not been inactive for the predetermined amount of time (i.e., that the mail slot has been active), method 300 returns to operation 310. There, new read and/or write commands may be received from the I/O source and processed. However, in response to determining that the mail slot has been inactive for the predetermined amount of time, method 300 advances from operation 318 to operation 320. There, operation 320 includes causing the DMA engine channel selected in operation 314, and the corresponding CPU, to be deallocated. Again, DMA engine channels, CPUs, and other resources (e.g., components) may be utilized to perform ongoing read and/or write commands while an I/O source is slow or inactive. Approaches herein are thereby able to achieve dynamic levels of throughput that correspond to the type and number (e.g., volume) of I/O commands that are received in real-time.

Returning now to operation 312 of FIG. 3, method 300 advances to operation 322 in response to determining a read command has been received from the I/O source. There, operation 322 includes selecting one of the DMA engine channels that are correlated with the CECs to perform the read command.

As noted above, DMA engine channels at the CECs are able to perform at least a portion of received read commands more efficiently than DMA engine channels on the I/O bays. Thus, by selecting one of the DMA engine channels correlated with the CECs, method 300 is able to perform the write command more efficiently than is otherwise achievable, e.g., as would be appreciated by one skilled in the art after reading the present description.

The DMA engine channels at the CECs may further be inspected and selected from in order to improve performance. For instance, DMA engine channels at the CECs are evaluated based at least in part on the achievable throughput of the CECs that the respective DMA engine channels are located at. DMA engine channels at CECs that are able to achieve a higher throughput may thereby be selected to perform the read command, further reducing latency and performance overhead.

From operation 322, method 300 advances to operation 324. There, one or more instructions are sent causing the read command to be performed by the DMA engine channel selected in operation 322, along with the respective CPU that is correlated with the mail slot that received the read command. As noted above, because correlated groupings of components are utilized to perform I/O commands received from a source, the I/O commands may be satisfied without locking the corresponding components. Avoiding the process of locking and unlocking resources has a significant impact, and approaches herein are able to satisfy received read and/or write commands more efficiently than conventionally achievable, leading to reduced latency and causing performance as a whole to be improved further still.

In response to the read command being satisfied, method 300 advances to operation 326. There, operation 326 determines whether the mail slot that received the read command has been inactive for a predetermined amount of time. It follows that operation 326 may include inspecting (e.g., monitoring) the mail slot that received the read command and identifying any commands or other information that is received therein. Again, the predetermined amount of time may be set by a user, a system administrator, during manufacture as a result of performance testing, based on industry standards, etc.

In response to determining that the mail slot has been active, method 300 returns to operation 310. There, new read and/or write commands may be received from the I/O source and processed accordingly. However, in response to determining that the mail slot has been inactive for the predetermined amount of time, method 300 advances from operation

326 to operation 328. There, operation 328 includes causing the DMA engine channel selected in operation 322, and the corresponding CPU, to be deallocated. Again, DMA engine channels, CPUs, and other resources (e.g., components) may be utilized to perform ongoing read and/or write commands while an I/O source is slow or inactive. Approaches herein are thereby able to achieve dynamic levels of throughput that correspond to the type and number (e.g., volume) of I/O commands that are received in real-time.

Again, the operations of method 300 are desirably able to dynamically align groups of DMA engine channels and CPUs to I/O resources, thereby allowing for commands to be performed without locking out resources. As a result, approaches herein are able to satisfy received read and/or write commands more efficiently than conventionally achievable, leading to reduced latency and causing performance as a whole to be improved.

According to an in-use example which is in no way intended to be limiting, a system includes four mail slots "Mail Slots 0-3" and four CPUs "CPUs 1, 3, 5, 7". The system further includes a total of eight DMA channels (also referred to herein as engine channels), of which four DMA channels "Channels 0-3" are configured to perform write commands, and the remaining four DMA channels "Channels 4-7" are configured to perform read commands.

In this example, "Mail Slots 0-3", "CPUs 1, 3, 5, 7", and the eight DMA channels are allocated to prioritize read and write commands received from a given I/O source. However, while Mail Slots 0-3 are not receiving any read and/or write commands from the I/O source, the four CPUs and eight DMA channels may be used to perform other read and/or write commands (commands not received from the I/O source). However, in response to completing a string of commands, a CPU "CPU 3" may determine that an I/O command has been received in one of "Mail Slots 0-3" from the I/O source. In response to making this determination, and identifying the I/O source is a write command, "CPU 3" allocates DMA "Channel 3", such that "CPU 3" and DMA "Channel 3" are dedicated to process the write command in the mail slot.

In response to the write command being completed and an indication being returned to the I/O source of the write command outcome, a predetermined amount of time is honored before the resources are deallocated and available to perform other I/O commands received in "Mail Slots 0-3" and/or other work. In some approaches, the predetermined amount of time is about 1 hour of experiencing (receiving) no work in the mail slots. However, the predetermined amount of time may be 1 second, 5 seconds, 10 seconds, 40 seconds, 1 minute, 2 minutes, 5 minutes, 10 minutes, 20 minutes, 45 minutes, 1 hour, 10 hours, 1 day, 2 days, 3 days, etc. depending on the desired approach.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:

allocating a group of central processing units (CPUs) in a system to an input/output (I/O) resource;

allocating a group of mail slots from memory in the system, the allocated mail slots being configured to receive read and/or write commands from the I/O resource; and allocating a group of direct memory access (DMA) engine channels in the system to the I/O resource, such that a first subset of the DMA engine channels are configured to perform read commands for the mail slots, and a second subset of the DMA engine channels are configured to perform write commands for the mail slots, wherein the first subset of DMA engine channels are located on a central electronic complex (CEC) of the system, wherein the second subset of DMA engine channels are correlated with I/O bays that are connected to respective slots that extend across the CEC, wherein the slots are further connected to respective microprocessors.

2. The method of claim 1, further comprising:

in response to receiving a write command at a first of the mail slots, selecting one of the DMA engine channels in the second subset to perform the write command, based at least in part on how close the respective DMA engine channels are located to a source of the write command.

3. The method of claim 2, further comprising:

in response to:

the write command being performed, and the first mail slot being unused for a predetermined amount of time, causing the selected DMA engine channel, and a corresponding one of the CPUs, to be deallocated.

4. The method of claim 1, further comprising:

in response to receiving a read command at a second of the mail slots, selecting one of the DMA engine channels in the first subset to perform the read command, based at least in part on how close the respective DMA engine channels are located to a source of the read command.

5. The method of claim 4, further comprising:

in response to:

the read command being performed, and the second mail slot being unused for a predetermined amount of time, causing the selected DMA engine channel, and a corresponding one of the CPUs, to be deallocated.

6. The method of claim 1, wherein the I/O bays, the slots, and the microprocessors are directly coupled to each other by Peripheral Component Interconnect Express (PCIe) cables.

7. The method of claim 6, wherein the I/O bays, the slots, and the microprocessors are indirectly coupled to each other by a wireless connection.

8. The method of claim 1, wherein the group of direct memory access (DMA) engine channels is twice as large as: the group of CPUs, and the group of mail slots, respectively.

9. A computer program product comprising:

one or more computer-readable storage media; and program instructions stored on the one or more storage media to perform operations comprising:

allocating a group of central processing units (CPUs) in a system to an input/output (I/O) resource;

allocating a group of mail slots from memory in the system, the allocated mail slots being configured to receive read and/or write commands from the I/O resource; and allocating a group of direct memory access (DMA) engine channels in the system to the I/O resource, such that a first subset of the DMA engine channels are configured to perform read commands for the mail slots, and a second subset of the DMA engine channels are configured to perform write commands for the mail slots, wherein the first subset of DMA engine channels are located on a central electronic complex (CEC) of the system, wherein the second subset of DMA engine channels are correlated with I/O bays that are connected to respective slots that extend across the CEC, wherein the slots are further connected to respective microprocessors.

10. The computer program product of claim 9, wherein the operations further comprise:

in response to receiving a write command at a first of the mail slots, selecting one of the DMA engine channels in the second subset to perform the write command, based at least in part on how close the respective DMA engine channels are located to a source of the write command.

11. The computer program product of claim 10, wherein the operations further comprise:

in response to:

the write command being performed, and the first mail slot being unused for a predetermined amount of time, causing the selected DMA engine channel, and a corresponding one of the CPUs, to be deallocated.

12. The computer program product of claim 9, wherein the operations further comprise:

in response to receiving a read command at a second of the mail slots, selecting one of the DMA engine channels in the first subset to perform the read command, based at least in part on how close the respective DMA engine channels are located to a source of the read command.

13. The computer program product of claim 12, wherein the operations further comprise:

in response to:

the read command being performed, and the second mail slot being unused for a predetermined amount of time, causing the selected DMA engine channel, and a corresponding one of the CPUs, to be deallocated.

14. The computer program product of claim 9, the I/O bays, the slots, and the microprocessors are indirectly coupled to each other by a wireless connection.

15. The computer program product of claim 14, wherein the I/O bays, the slots, and the microprocessors are directly coupled to each other by Peripheral Component Interconnect Express (PCIe) cables.

16. The computer program product of claim 9, wherein the group of direct memory access (DMA) engine channels is twice as large as: the group of CPUs, and the group of mail slots, respectively.

17. A computer system comprising:

a processor set;

one or more computer-readable storage media; and program instructions stored on the one or more storage media to cause the processor set to perform operations comprising:

allocating a group of central processing units (CPUs) in a system to an input/output (I/O) resource;

allocating a group of mail slots from memory in the system, the allocated mail slots being configured to receive read and/or write commands from the I/O resource; and allocating a group of direct memory access (DMA) engine channels in the system to the I/O resource, such that a first subset of the DMA engine channels are configured to perform read commands for the mail slots, and a second subset of the DMA engine channels are configured to perform write commands for the mail slots, wherein the first subset of DMA engine channels are located on a central electronic complex (CEC) of the system, wherein the second subset of DMA engine channels are correlated with I/O bays that are connected to respective slots that extend across the CEC, wherein the slots are further connected to respective microprocessors.

18. The computer system of claim 17, wherein the operations further comprise:

in response to receiving a write command at a first of the mail slots, selecting one of the DMA engine channels in the second subset to perform the write command, based at least in part on how close the respective DMA engine channels are located to a source of the write command.

19. The computer system of claim 17, wherein the operations further comprise:

in response to receiving a read command at a second of the mail slots, selecting one of the DMA engine channels in the first subset to perform the read command, based at least in part on how close the respective DMA engine channels are located to a source of the read command.

20. The computer system of claim 17, wherein the I/O bays, the slots, and the microprocessors are directly coupled to each other by Peripheral Component Interconnect Express (PCIe) cables.

* * * * *